Figure 6:
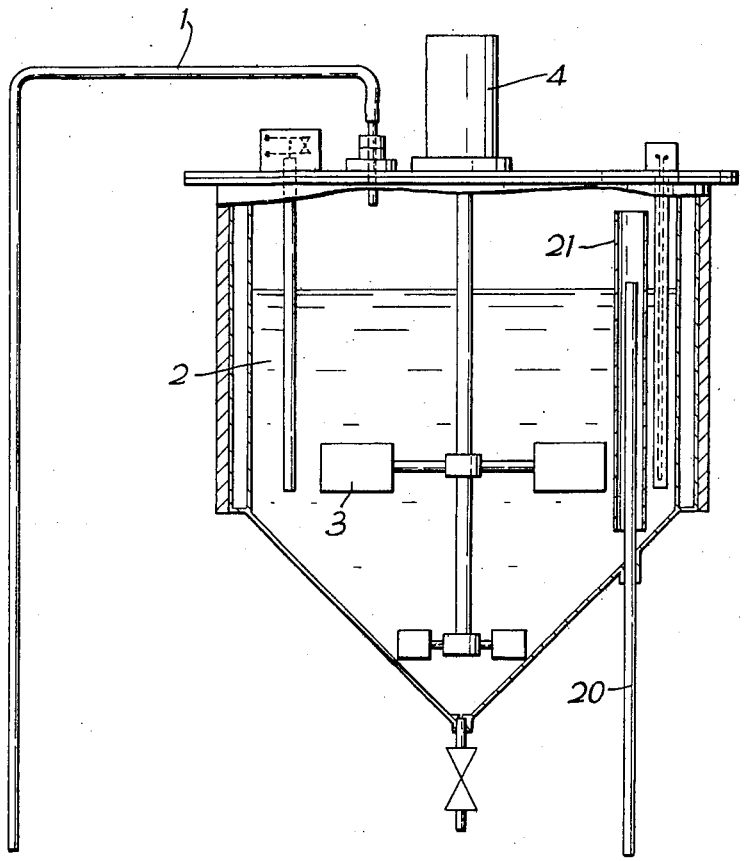

Feb. 19, 1963  J. S. HOUGH ETAL  3,078,166
CONTINUOUS BREWING
Filed Oct. 6, 1960  2 Sheets-Sheet 1
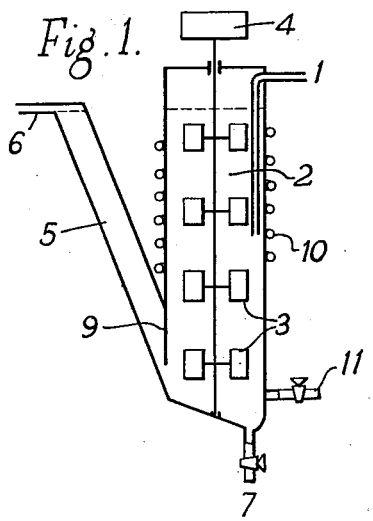
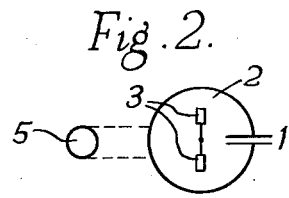
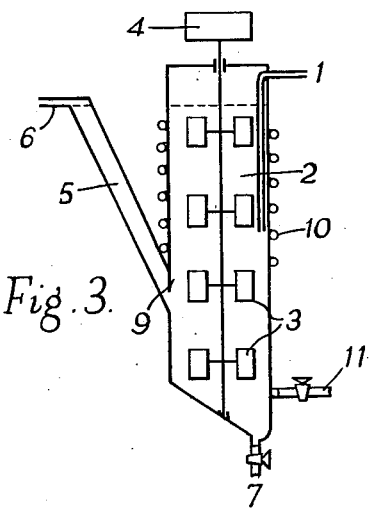
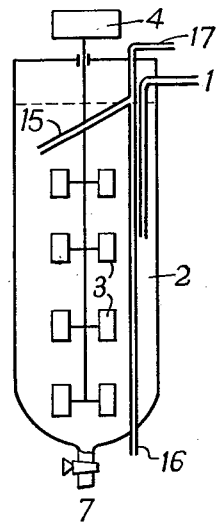
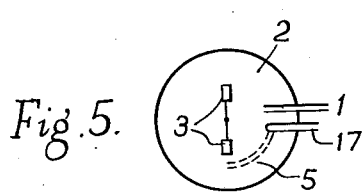
INVENTORS
JAMES SHANKS HOUGH & ROBERT WILLIAM RICKETTS
BY Wenderoth,
Lind and Ponack
ATTORNEYS.

INVENTORS
JAMES SHANKS HOUGH & ROBERT WILLIAM RICKETTS

BY Wenderoth,
Lind and Ponack
ATTORNEYS

United States Patent Office 3,078,166
Patented Feb. 19, 1963

3,078,166
CONTINUOUS BREWING
James Shanks Hough, Caterham, and Robert William Ricketts, Worth, England, assignors to Brewing Patents Limited, London, England
Filed Oct. 6, 1960, Ser. No. 60,875
Claims priority, application Great Britain Oct. 9, 1959
3 Claims. (Cl. 99—43)

The present invention relates to the production of beer by a fermentation process which may be operated continuously or substantially continuously.

One object of the present invention is to provide a process for the production of beer in which a high rate of output is attained in relation to the space and apparatus employed.

Another object of the present invention is to provide a fermentation process in which means are secured for controlling the quantity of yeast present in the fermenting liquid and hence the rate of fermentation.

Still another object of the present invention is to provide a process whereby wort can be fermented with production of substantially smaller quantities of yeast than is possible in known processes.

Continuous processes for the fermentation of brewers wort are known and these are claimed to have a high rate of production in comparison with the conventional batch processes. In the known processes, however, a yeast separation stage is employed in which yeast is separated from the fermented wort and in most known processes the yeast separated from the fermented wort is recycled to the fermentation stage. The present invention permits a more compact apparatus to be used as no separate yeast separation stage is required unless it is specifically desired to produce yeast in conjunction with the production of beer. This is achieved by using a process which permits the separation of the yeast from the fermented wort to be effected in the actual fermentation vessel.

In all continuous fermentation processes a continuous or semi-continuous stream of wort is passed through one or a series of fermentation vessels, in which the wort is usually agitated with yeast so as to procure favourable fermentation conditions.

The process of the present invention depends on maintaining, in the fermentation vessel or in the series of fermentation vessels, an unagitated zone from the top of which beer can be withdrawn. It will be appreciated that the yeast will tend to settle out in this unagitated zone so that, depending on the size of the zone, the nature of the yeast and the rate of flow of wort through the unagitated zone, the concentration of yeast in the fermenting wort can be substantially maintained at a level above that in the issuing fermented wort which itself can be accurately controlled.

The tendency of the yeast to settle out of the fermented wort is found to vary according to the strain of yeast used and the present invention is most conveniently used in conjunction with yeast which will separate relatively quickly from the wort.

Especially suitable yeasts are found to be those having a high tendency to flocculence and giving values within the range of 1.5–4.0 ml. when measured by the method described by E. Helm, B. Nohr and R. S. W. Thorne in Wallerstein Laboratories Communications, vol. XVI, p. 315, 1953.

In a preferred form an apparatus for carrying out the present invention comprises a vertical cylindrical fermentation vessel, which is provided with an agitating means, preferably a mechanical agitator, or alternatively, means for perfusion by gas, such as $CO_2$. The fermentation takes place within this vessel, fresh wort being fed into the vessel at any position where it becomes mixed rapidly with the contents of the vessel by reason of the agitation. The lower part of the vessel connects with a side arm, the height of which controls the height of liquid in the vessel, so that fermented wort spills out of the vessel through this side arm.

The apparatus may readily be constructed in such manner that liquid standing in the side arm is subjected to very little, if any, agitation so that the yeast carried into it by the wort settles out of the side arm to the bottom of the vessel against the flow of wort. For this reason the diameter of the side arm must be such that the rate of flow of wort through it is slow, if it is desired that the rate of yeast production should be low.

The junction of the side arm and the vessel is preferably shielded by downwardly hanging baffles to protect the contents of the side arm from the agitation in the vessel, but at the same time permitting flocculent yeast to settle out of the side arm without becoming trapped.

The very simple apparatus of the present invention is preferably completed by an outlet in the bottom of the vessel, through which excess yeast (if any) can be periodically withdrawn. An air inlet is preferably also provided in the bottom of the vessel to permit aeration of the fermenting wort and thus to stimulate the growth of yeast when such is desired. A further outlet for fermented wort a little above the bottom of the vessel is provided to permit the contents to be withdrawn when the process is stopped. The apparatus is likewise provided with heating and cooling means, preferably coils arranged externally of the vessel, to permit control of the temperature of the fermentation.

The invention is hereinafter illustrated with reference to the accompanying diagrammatic drawings wherein FIGURE 1 is an elevation of one form of apparatus,
FIGURE 2 is a plan view of the apparatus,
FIGURE 3 is an elevation of a slightly modified form of apparatus,
FIGURE 4 is an elevation of a further modified form of apparatus,
FIGURE 5 is a plan view of the apparatus of FIGURE 4, and
FIGURE 6 is an elevation of a further modified form of apparatus.

In the form of apparatus shown in FIGURES 1 and 2 sterile wort is fed through a pipe 1 into a cylindrical fermentation vessel 2 containing suitable yeast and fermenting wort. The contents of the vessel can be agitated by means of stirrer blades 3 carried on an axial spindle driven by a motor 4.

As the volume of liquid in the fermentation vessel 2 is augmented by the wort fed into it through the pipe 1 beer is displaced through a side arm tube 5 and overflows into the pipe 6 and passes into a beer receiver (not shown). The great bulk of the yeast employed fails to remain in suspension in tube 5 which is protected from agitation by a baffle. The yeast therefore falls back into the bottom of the fermentation vessel 2.

The tube 7 at the base of the fermentation vessel is provided both for draining off excess yeast when desired and also for the introduction of air when this is desirable. Equipment for keeping constant the temperature of the fermentation medium in the vessel is indicated diagrammatically as water jackets or coils 10. An additional outlet 11 is provided so that all the beer in the fermentation vessel may be run off separately from the yeast when it is desired to close down production temporarily, as for example over a week-end or public holiday period.

In the modified form of apparatus shown in FIGURE 2 the side arm is taken out at a position a little above the bottom of the vessel. There is otherwise no difference between them and similar practical results are obtained with both forms of apparatus.

In the apparatus shown in FIGURES 4 and 5, wort overflows through a side arm 15 arranged inside in the top of the vessel and having an outlet tube 16, which is also provided with a siphon-breaking vent 17.

In the apparatus shown in FIGURE 6 wort overflows through a tube 20 which is surrounded by a concentric tube 21 so disposed that the mixture of fermented wort and yeast must pass up through the unagitated space within the tube 21 before the fermented wort can escape down tube 20. By vertical adjustment of the relative positions of tubes 20 and 21 the quantities of yeast escaping from the apparatus can be controlled and the concentration of yeast within the vessel maintained at a predetermined level.

It is found that operating the process with a continuous flow of wort and using wort of specific gravity 1.040 a brewing cycle can be completed in a period of 18 down to 7 hours or less at 25° C. to produce a beer of specific gravity 1.008. A brewing cycle is the time taken to produce an amount of fermented wort equal to the effective volume of the apparatus. The variation in time of the brewing cycle was given by the use of strains of yeast having different tendencies to separate from the fermented wort. With these yeasts the amounts of yeast present in the apparatus varied between 35 and 100 gms./litre when the process was operating under steady state conditions and the brewing cycle time was roughly inversely proportional to the concentration of yeast in the vessel during steady state conditions.

It is also found that the present method can be operated to lead to relatively little yeast growth, as compared to conventional batch brewing techniques, so that a somewhat stronger beer is produced from a given wort. In the example given above a small amount of yeast at a concentration of 1-5 gms./litre spilled over with the wort and this is a measure of the yeast growth when steady state conditions are attained. This small amount of yeast can be readily removed by the usual methods of filtration or cleansing wtih isinglass finings. However, greater output of yeast can be obtained by partial or complete removal of the baffles 9 (FIGURE 1) or by adjusting the relative positions of tubes 20 and 21 (FIGURE 6) to provide a smaller unagitated space.

A particular advantage of the apparatus of the present invention is that the vertical vessels which it employs may be used to replace the existing vertical fermentation vessels conventionally employed in a brewery.

As an alternative method to the construction of FIGURES 4 and 5 fermented wort may be separated by the use of an outlet in the side of the vertical fermentation vessel at a predetermined level below the liquid level of the vessel. This outlet replaces the side arm 15 in the apparatus described above. In this alternative method the agitation of the fermentation vessel is stopped periodically. The level of yeast then starts to fall away and when this drops below the outlet, the contents of the vessel above the outlet are run off. The contents of the vessel above the outlet are perhaps $\frac{1}{20}$ of the whole, so that the fermented wort is run off about every half hour.

We claim:

1. A process for the production of potable beer comprising agitating a body of brewers wort and brewing yeast out of contact with air for dispersion of said yeast through said wort to promote rapid fermentation of said wort, keeping the temperature of said body of wort and yeast constant, adding a stream of unfermented wort to said body of wort and yeast, and simultaneously drawing off a stream of fermented wort and yeast from said agitated body of wort and yeast upwardly and directly into an unagitated zone, drawing off fermented wort directly from the top of said unagitated zone, and permitting yeast to fall back from the bottom of said unagitated zone into said agitated body of wort and yeast.

2. A process for the production of potable beer comprising leading a continuous stream of brewers wort into an enclosed zone, agitating a body of fermenting wort and brewing yeast in said enclosed zone under constant temperature conditions to disperse yeast in said wort and promote favorable fermentation conditions, and simultaneously drawing off a continuous stream of fermented wort and yeast directly from said agitated body of wort and yeast and along an upwardly directed path, maintaining substantially unagitated conditions in the liquor passing through said path so as to permit separation of yeast from fermented wort therein, withdrawing fermented wort from the top end of said path, and permitting yeast to fall back from the bottom of said path into said agitated body of wort and yeast.

3. A process for the production of potable beer comprising maintaining dispersion of brewing yeast through a body of fermenting brewers wort held in an enclosed zone by application of agitation, controlling the temperature of said body of wort to maintain it substantially constant, leading a continuous stream of unfermented wort into said body of wort and yeast and simultaneously drawing off a continuous stream of fermented wort and yeast from said agitated body of wort and yeast at equal rates, passing said continuous stream of fermented wort and yeast directly from a low level in said body along an upwardly inclined path, within which said fermented wort and yeast is maintained substantially unagitated, yeast being permitted to separate from said fermented wort in passage through said path and to fall back into said agitated body of fermenting wort and yeast, and withdrawing partially deyeasted beer from the top end of said upwardly inclined path.

References Cited in the file of this patent

UNITED STATES PATENTS

| | | |
|---|---|---|
| 1,982,002 | Hatch | Nov. 27, 1934 |
| 2,083,348 | Scholler et al. | June 8, 1937 |